Patented May 28, 1935

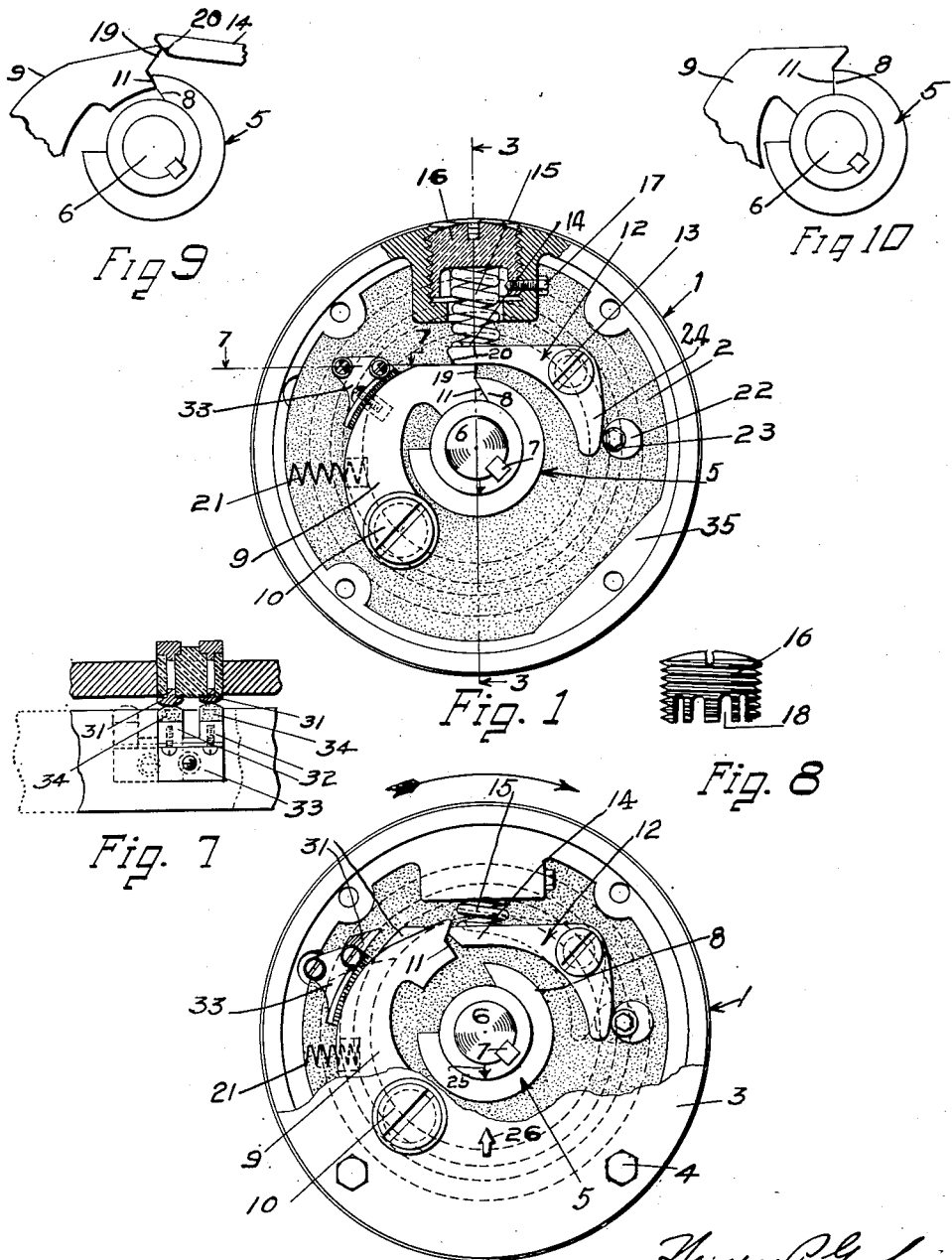

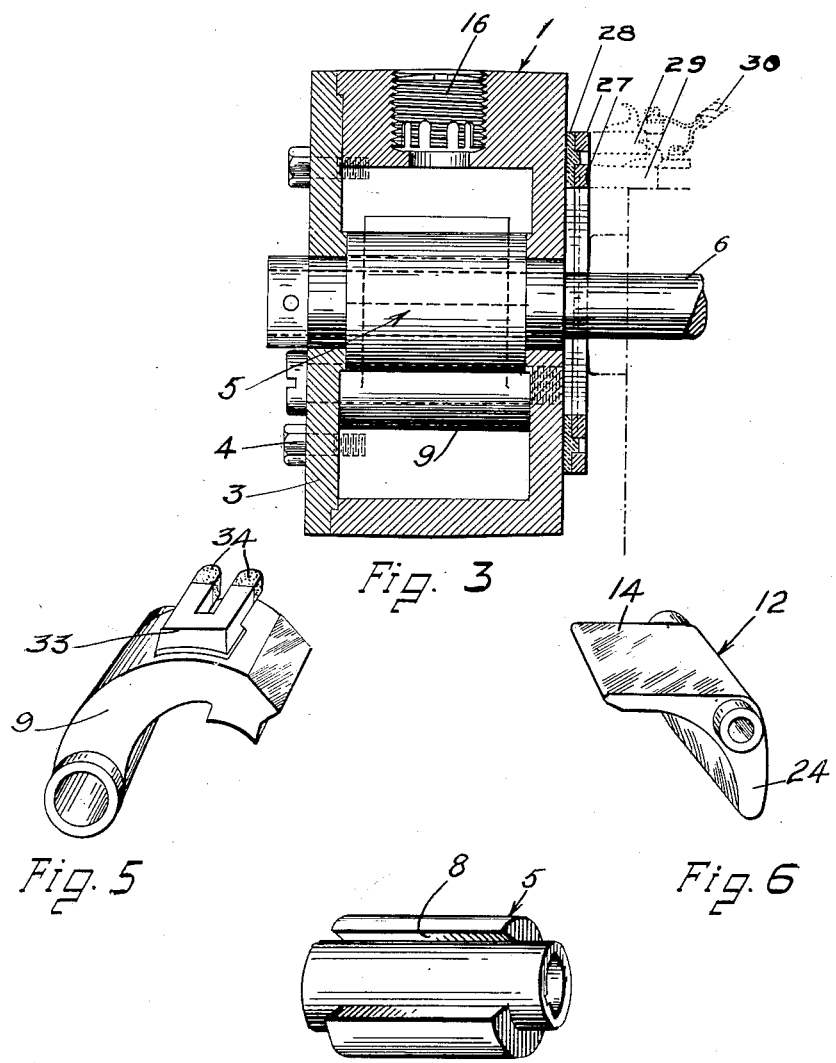

2,003,115

UNITED STATES PATENT OFFICE 2,003,115

LOAD LIMITING DEVICE

Henry P. Grohn, Chicago, Ill.

Application September 26, 1932, Serial No. 634,907

5 Claims. (Cl. 192—150)

This invention relates to automatic load limiting devices, and more particularly to automatic releasing clutches or load limiting devices in which a driving member is quickly and efficiently released from a driven member upon the application of a minimum amount of overload.

While the present invention is particularly adapted for use with punch presses and similar machines wherein the power must be very quickly released to prevent injury to the punch or die, or other parts of the machine, it is also adapted for use on any type of machine wherein it is desirable to promptly stop the driven mechanism in any case where a load beyond a predetermined limit is undesirable.

It is an object of the present invention to provide a simple and efficient device which may be very accurately adjusted to release at substantially any desired predetermined load, and wherein the parts are so arranged that a positive drive is provided for all normal loads and in which auxiliary means is provided to quickly and efficiently disengage the driven member immediately upon the application of an overload.

A further object is to provide an efficient overload release device which may be applied to substantially any character of driving mechanism for releasing the driven mechinsm upon the application of an overload thereto.

It is also an object to provide a simple and efficient overload release device of few parts which is easy to manufacture and assemble and which will not easily get out of order.

Further objects will be apparent from the specification and the appended claims.

In the drawings:

Figure 1 is a side elevation of a driving pulley with one side removed and illustrates one embodiment of the invention incorporated therewith and with clutch mechanism engaged in driving relation;

Fig. 2 is a side elevation of the embodiment illustrated in Fig. 1 with a portion of the cover broken away and the driving member shown released from the driven member;

Fig. 3 is a transverse sectional view through the driving member and taken on a line corresponding to line 3—3 of Fig. 1;

Fig. 4 is a perspective view of a sleeve which forms the driven member of the automatic clutch;

Fig. 5 is a perspective view of the clutch pawl and the electrical bridging contact carried thereby, the latter forming a part of an electrical control or signal system which is used in connection with the load limiting device;

Fig. 6 is a perspective view of the clutch reset lever which also functions in cooperation with the clutch pawl to promptly release the clutch;

Fig. 7 is a transverse sectional view taken on a line corresponding to line 7—7 of Fig. 1 and illustrates that portion of the electrical control system cooperating with the clutch pawl;

Fig. 8 is a side elevation of the reset lever adjusting screw;

Fig. 9 is a fragmentary view of the reset lever clutch engaging portions of the device and illustrates the position of the parts during release; and Fig. 10 is a fragmentary detail view illustrating a driving pawl and driven sleeve with cooperating angular cam surfaces arranged to cause the mechanism to operate for release over a lower load limit range than the arrangement illustrated in the other views.

Referring to the drawings in detail, the embodiment illustrated comprises a pulley 1 having a chamber 2 therein, and a cover 3 therefor which latter may be secured in any suitable manner as by means of machine screws 4.

A sleeve 5 is mounted in suitable bearings in the rear wall of the pulley and in the cover plate 3. This sleeve, in the present instance, is illustrated as secured to a driven shaft 6 by means of a key 7.

It should be understood that the sleeve 5, or its equivalent, may be secured to any suitable type of driven member and in any suitable manner. Also, while I have illustrated my invention in connection with the ordinary pulley for belt drive, the device may be used in connection with, and form a part of, any suitable portion of a driving mechanism, such as a gear or other movable driven member.

The sleeve 5 is cut away to provide a recess to receive the end of a clutch pawl and one side of the recess is provided with an angular pawl-engaging surface 8. A clutch pawl 9 is pivoted on the inner face of the pulley 1 at 10 and is also provided with an angular engaging surface 11 which latter is arranged to engage and cooperate in driving relation with the angular surface 8 when the clutch is in engagement as shown in Fig. 1.

A reset lever 12 is pivoted on the inner face of the pulley 1 at 13 and is provided with an arm 14 normally engaging the pawl 9. A spring 15 is arranged to exert pressure against the arm 14 and thereby cause the latter to bear against the pawl 9 for retaining the pawl in engagement with the sleeve 5. The resistance of this spring may be adjusted by means of a nut 16 which is threaded into the periphery of the pulley and which may be adjusted to retain the clutch in engagement and to allow release only when a sufficient load has been applied to the driven member to overcome the compression of the spring. The nut 16 may be retained in its adjusted position by means of a screw 17 extending into one of the slots 18 in the nut. By this method of adjustment the retaining pressure and consequently the driving load limit and the point at which the release of the clutch will take place may be very accurately adjusted. The operation of the mechanism is as follows:

With a normal load on the driven member corresponding to the adjustment of the nut 16 and the spring 15, the parts will be retained in the position illustrated in Fig. 1. However, in case of an overload on the driven member, the pressure between the inclined surfaces 11 and 8 of the pawl 9 and sleeve 5, respectively, will cause the pawl 9 to be moved outwardly by the cam action of the cooperating surfaces until the pawl is released from the reset lever 12 and the apex of the point or projecting portion 19 on the driving pawl is engaged by an inclined surface 20 on the reset lever, as illustrated in Fig. 9. This inclined surface 20 is arranged at such an angle to a line drawn through the apex of the point 19 and the pivot 10 of the pawl 9 that the surface 20 then acts as a cam with the apex of the point 19 as a follower, and, due to the pressure of the spring 15, this cam surface causes the pawl 9 to be quickly thrown completely out of engagement, that is the downward pressure of the spring 15 on the reset lever arm 14 causes the driving pawl 9 to be very quickly thrown outwardly thereby completely disengaging the driving surfaces 11 and 8. The rapid movement of pawl 9 caused by the pressure of the reset lever causes a very quick release of the driving and driven parts and allows the clutch to be disengaged with a minimum amount of overload or a maximum load limit to which the device has been adjusted. The rapid movement of the pawl 9 away from the sleeve 5 also prevents wear or breakage of the points of the sleeve 5 and the pawl 9 adjacent the surfaces 8 and 11, respectively.

After the clutch has been completely disengaged the parts are in the position illustrated in Fig. 2. A comparatively light spring 21 tends to move the pawl 9 inwardly into engagement with the sleeve 5 when the pawl is released from its engagement with the arm 14 of the reset lever 12. The arm 14 of the reset lever 12 retains the pawl 9 disengaged and may be raised for releasing the pawl 9 and allowing the spring 21 to again cause the engagement of the clutch. This releasing may be accomplished by means of a manually operable cam 22 which is mounted for rotation in the pulley 1. This cam is provided with an outwardly extending portion 23 which may extend through or in alignment with a suitable opening in the cover plate 3 and which is arranged to be engaged by a suitable socket wrench whereby the cam 22 may be rotated to engage a downwardly extending arm 24 on the reset lever 12 and thereby raise the arm 14 out of engagement with the driving pawl 9. The spring 21 will then cause the driving pawl to be reengaged in driving relation with the sleeve 5.

It should be noted that the angular relation of the sleeve face 8 and the pawl face 11 together with the adjustment of the spring 15 determine the normal load to be carried by the device. The sleeve 5 and pawl 9 are easily removable and interchangeable with other sleeves and pawls on which may be provided faces of different angles; therefore, due to this interchangeable feature and the accurate adjustment of the spring 15, the device may be easily adapted to provide for any desired normal load and in any case will promptly and efficiently release the device at a predetermined load limit. In Fig. 9 the angular relation of the cooperating pawl and sleeve surfaces is arranged for clutch release over a different load limit range than that described previously.

The bearing of the sleeve 5 extends through the cover plate 3 and is provided with an arrow 25 or other indicating symbol which should be brought into alignment with the corresponding indicating device 26 on the cover plate when the device is assembled. This provides for a quick and easy assembly of the entire device.

In some instances, it is desirable that the driving member should also be stopped when the clutch is disengaged due to overload. In order to accomplish this result, it is necessary to provide means whereby a motor circuit may be interrupted or a signal may be controlled to notify the operator that the clutch has been disengaged. In the embodiment illustrated, a means is provided whereby an electrical circuit may be broken simultaneously with the disengagement of the clutch. This circuit may normally control the operation of a motor for driving the driven member or it may control any suitable electrical signal. The motor may be controlled through a relay if desired. It should be understood that while the present device illustrates a closed circuit to be interrupted when the clutch is disengaged, it may be used equally well to close an open circuit upon disengagement of the clutch. The device for accomplishing this result comprises conducting rings 27 which are secured to, and suitably insulated from, the pulley 1 by means of an insulator 28. Any suitable brushes 29 may be supported in engagement with these rings and connected to any suitable electrical circuit 30.

The conducting rings 27 are provided with inwardly extending contact members 31, which latter are also suitably insulated from the pulley 1 and extend into the chamber 2.

A bridging member 32 is supported on a suitable bracket 33 secured to the pawl 9 and insulated therefrom. This bridging member 32 is preferably provided with carbon or other suitable brushes 34 which are in electrical engagement with the inwardly extending contact members 31 when the clutch is in engagement as shown in Fig. 1 and Fig. 7. During the disengagement of the clutch, the pawl 9 is moved outwardly and the bridging member is moved to the position shown by dotted lines in Fig. 7, thereby breaking the electrical circuit 30 controlling a motor circuit through a suitable relay, or the breaking of the circuit 30 may control a suitable signal as mentioned previously.

In case it is desirable to control an open circuit, that is, to close the open circuit when the clutch is disengaged, it is only necessary to secure larger conducting rings 27 to the pulley whereby the contact members 31 will be engaged by the bridging member 32 when the pawl is in the disengaged position shown in Fig. 2 instead of in the engaged position shown in Fig. 1.

It will be obvious that the pulley may be suitably balanced to compensate for the weight of the various operating parts by means of integral cast portions such as a part 35 on the pulley or suitable weights may be added thereto.

Having thus described my invention, what I claim and desire to secure by Letters Patent is:

1. In a load limiting device of the character described including a driving element and a driven element, a movable member on one of said elements, an engaging surface on the other element, a cooperating engaging surface on said movable member, means for yieldably holding said surfaces in engagement to drive said driven element to a predetermined load limit, said surfaces being arranged to tend to force the movable member out of engagement at said predetermined load limit, and means controlled by said holding means to quickly complete the disengagement at said predetermined limit.

2. In a load limiting device of the character described including a driving element and a driven element, a cam surface on said driven element, a movable member on said driving element and arranged to engage said cam surface in driving relation, resilient means for retaining said driving relation to a predetermined load limit and to allow a partial disengagement at said limit, and means between said movable member and said resilient means and controlled by said resilient means for quickly causing a complete disengagement immediately following said partial disengagement.

3. A load limiting device of the character described comprising a driving element, a driven element, a pawl cooperating for releasable engagement between said driving element and said driven element, means for yieldably maintaining the engagement of said pawl and said driven element to a predetermined load limit and adjustable for varying said load limit, the engaging surfaces of said pawl and said driven element being arranged to cause a partial disengagement at said predetermined limit, means for causing a complete disengagement at a more rapid rate than partial disengagement and for maintaining said disengagement, means tending to cause a reengagement, and means for releasing said pawl to cause a reengagement.

4. A load limiting device of the character described comprising a driving element, a driven element, a pawl cooperating for releasable engagement between said driving element and said driven element, yieldable means for maintaining the engagement of said pawl and said driven element to a predetermined load limit and adjustable for varying said load limit, the engaging surfaces of said pawl and said driven element being arranged to cause a partial disengagement at said predetermined limit, means for causing a complete disengagement at a more rapid rate than the partial disengagement and for maintaining said disengagement, means tending to cause a reengagement, means for releasing said pawl to permit a reengagement, an electrical circuit, electrical terminals on one of said elements and forming a part of said circuit and means controlled by movement of said pawl for making and breaking said circuit.

5. In a device of the character described, a driving element, a driven element, a pawl on said driving element, cooperating engaging surfaces on said pawl and said driven element, said surfaces being arranged to provide a cam action therebetween to cause a partial disengagement at a predetermined load limit, adjustable releasing means for maintaining said engagement during a normal load, means for completing said disengagement at a more rapid rate than the partial disengagement, said means being arranged to hold said pawl out of engagement, means for releasing said pawl for reengagement, resilient means tending to cause engagement, electrical conductors on one of said elements and movable therewith and forming a movable part of a fixed electrical circuit; and means controlled by said pawl for making and breaking said electrical circuit.

HENRY P. GROHN.